US008023930B2

United States Patent
Won

(10) Patent No.: US 8,023,930 B2
(45) Date of Patent: Sep. 20, 2011

(54) APPARATUS AND METHOD FOR CONTROLLING LOCKING FUNCTION USING DIRECTION SENSOR IN PORTABLE TERMINAL

(75) Inventor: Jong-Se Won, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/592,409

(22) Filed: Nov. 24, 2009

(65) Prior Publication Data

US 2010/0130181 A1      May 27, 2010

(30) Foreign Application Priority Data

Nov. 27, 2008 (KR) .................. 10-2008-0118691

(51) Int. Cl.
*H04M 3/42* (2006.01)
(52) U.S. Cl. ............ 455/414.1; 455/411; 455/410; 455/413; 455/575; 455/563
(58) Field of Classification Search ........... 455/414.1, 455/563, 575, 410, 411, 466
See application file for complete search history.

(56) References Cited

U.S. PATENT DOCUMENTS

| 6,275,569 B1* | 8/2001 | Cannon ............... 379/88.01 |
| 2002/0167488 A1* | 11/2002 | Hinckley et al. .......... 345/156 |
| 2004/0101112 A1* | 5/2004 | Kuo ................. 379/88.01 |
| 2006/0046694 A1* | 3/2006 | Yu .................... 455/411 |
| 2006/0242434 A1* | 10/2006 | Lee .................. 713/300 |
| 2007/0259685 A1* | 11/2007 | Engblom et al. ........ 455/550.1 |
| 2008/0305771 A1* | 12/2008 | Yajima et al. ........... 455/411 |
| 2009/0262078 A1* | 10/2009 | Pizzi ................. 345/169 |

* cited by examiner

*Primary Examiner* — Charles Appiah
*Assistant Examiner* — Michael T Vu

(57) ABSTRACT

A mobile terminal includes an apparatus for controlling a locking function using a direction sensor. The apparatus includes an input element that receives a locking signal. The apparatus can detect direction information of the portable terminal, and set the lock of the portable terminal by storing the input locking signal and the detected direction information in a memory, or unset the lock of the portable terminal by comparing the input locking signal and the detected direction information with locking signal and direction information pre-stored in the memory. Accordingly, even if the locking signal is exposed, the locking signal is not authenticated if a terminal direction value is not correct, thereby maintaining security of the locking signal in a further improved manner without having to add another complex functions.

24 Claims, 5 Drawing Sheets

APPARATUS AND METHOD FOR CONTROLLING LOCKING FUNCTION USING DIRECTION SENSOR IN PORTABLE TERMINAL

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Nov. 27, 2008 and assigned Serial No. 10-2008-0118691, the entire disclosure of which is hereby incorporated by reference.

TECHNICAL FIELD OF THE INVENTION

The present invention relates to an apparatus and method for controlling a locking function using a direction sector of a portable terminal. More particularly, the present invention relates to an apparatus and method for setting or unsetting a locking signal by using a terminal direction value detected using a direction sensor (e.g., an acceleration sensor) together with the locking signal (e.g., password) as a security factor in a portable terminal.

BACKGROUND OF THE INVENTION

In general, a mobile terminal (e.g., a cell phone or a Personal Digital Assistant (PDA)) is a device for providing a communication function by which a user can make a call or exchange data while moving. The mobile terminal recently has been regarded as a personal necessity of modern life for people of all ages and both sexes, and a demand on the mobile terminal is expected to increase. With the development of technologies of the mobile terminal, various menus are provided so that a user can operate the mobile terminal by directly setting a bell sound type, a bell sound volume, an alarm, a lock, a transmission/reception restriction, and the like.

Meanwhile, although mobile terminals have slightly different forms, all of the mobile terminals have a locking function to prohibit other users against unauthorized use of a specific function or against reading of stored data. Examples of the locking function include automatic locking for prohibiting all usages of a mobile terminal, international call locking for restricting outgoing international calls, privacy protection locking for restricting checking of a stored phone number or an incoming/outgoing phone number or a message. The locking function is not limited to the above examples, and thus can be assigned to all functions which require avoidance of unauthorized use of other users.

In the conventional technique, a user combines several numeric characters by using a plurality of key buttons to pre-register a password of the user to a terminal, and sets a locking function by selecting a function to be restricted. Once the locking function is set, the user can unset the locking function of a specific function by inputting the pre-registered password. However, since the conventional terminal has pursued compact in size and light in weight according to its characteristic, a keypad needs to be configured such that a size of a keyboard layout or the number of keys thereof have a basic form capable of inputting minimum content. Therefore, there is a limitation in a format of a password that can be registered by the user. Additionally, the aforementioned method of registering a password by combining a plurality of numeric characters has a problem in that the password can be easily guessed by other users since personal information (e.g., a birthday, an anniversary, a social security number, and so forth) is used as the password in many cases.

Accordingly, there is a need for a method capable of overcoming a problem of the conventional technique in which a locking function of a terminal is restricted and capable of increasing security of the locking function.

SUMMARY OF THE INVENTION

To address the above-discussed deficiencies of the prior art, it is a primary aspect of the present invention is to solve at least the above-mentioned problems and/or disadvantages and to provide at least the advantages described below. Accordingly, an aspect of the present invention is to provide an apparatus and method for controlling a locking function using a direction sensor of a portable terminal.

Another aspect of the present invention is to provide an apparatus and method for setting or unsetting a locking signal by using a terminal direction value detected using a direction sensor (such as an acceleration sensor) together with the locking signal (such as a password) as a security factor in a portable terminal.

In accordance with an aspect of the present invention, a method of setting or unsetting a lock of a portable terminal is provided. The method includes inputting a locking signal, detecting direction information of the portable terminal, and setting the lock of the portable terminal by storing the input locking signal and the detected direction information in a memory, or unsetting the lock of the portable terminal by comparing the input locking signal and the detected direction information with locking signal and direction information pre-stored in the memory.

In accordance with another aspect of the present invention, an apparatus for setting or unsetting a lock of a portable terminal is provided. The apparatus includes an input element configured to receive an input a locking signal, a direction sensor configured to detect direction information of the portable terminal, and a controller configured to at least one of set the lock of the portable terminal by storing the input locking signal and the detected direction information in a memory, and unset the lock of the portable terminal by comparing the input locking signal and the detected direction information with locking signal and direction information pre-stored in the memory.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

The present invention proposes an apparatus and method for controlling a locking function using a direction sensor of a portable terminal. In particular, the present invention proposes an apparatus and method for setting or unsetting a locking signal by using a terminal direction value detected using a direction sensor (such as an acceleration sensor) together with the locking signal (such as password) input by a user through a keypad, a touchpad, a voice input element, and the like, as a security factor in a portable terminal. That is, the present invention described below relates to an apparatus and method for setting or unsetting a locking signal for a user in such a manner that, when user authentication is performed in a portable terminal, a direction in which the terminal is located is considered when the locking signal is input instead of simply inputting the locking signal, and the locking signal is set or unset only when each input unit of the locking signal coincides with the direction in which the terminal is located. For this, when the user inputs the locking signal, the user places the terminal in a direction that can be remembered by the user for each input unit of the locking signal. When the user unsets the locking signal by inputting the locking signal, the user adjusts the direction of the terminal to a direction corresponding to when the locking signal was set.

Although user authentication of one terminal will be described for example in the following description, the present invention may also apply to user authentication between terminals. Additionally, although user authentication is performed by one-to-one mapping each input unit of a locking signal and a direction of a terminal. For example, in the following description, user authentication may also be performed by one-to-one mapping a direction of a terminal and a corresponding locking signal when all locking signals are completely input.

Figure 1:
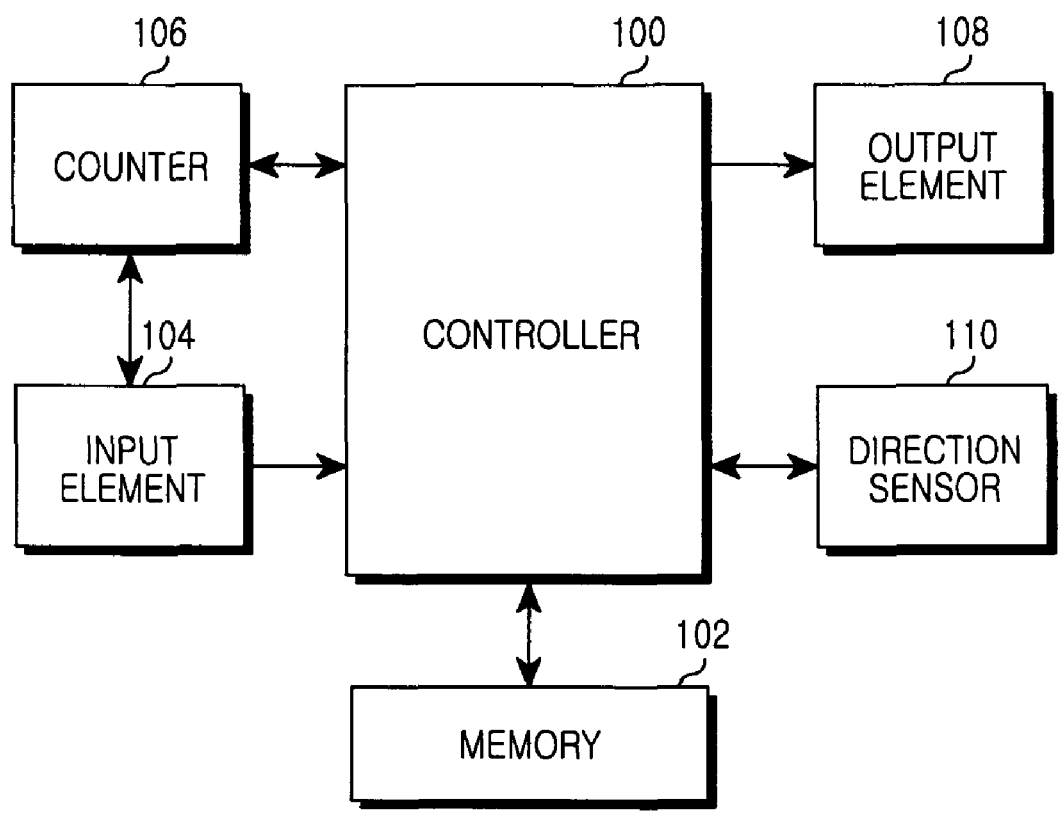
FIG. 1 illustrates a block diagram for a structure of a portable terminal according to an exemplary embodiment of the present invention.

FIG. 1 illustrates a block diagram for a structure of a portable terminal according to an exemplary embodiment of the present invention. In the following description, the portable terminal includes a cellular phone, a Personal Communication System (PCS), a Personal Data Assistant (PDA), an International Mobile Telecommunication (IMT)-2000 terminal, a Portable Multimedia Player (PMP), and the like. Hereinafter, typical structures of these exemplary devices will be described.

Referring to FIG. 1, the portable terminal includes a controller 100, a memory 102, an input element 104, a counter 106, an output element 108, and a direction sensor 110.

The controller 100 provides overall control to the portable terminal. For example, the controller 100 processes and controls voice calls and data communication. In addition to the typical functions, when in a locking signal set mode according to the present invention, the controller 100 performs processing and controlling for detecting a terminal direction value by driving the direction sensor 110 while receiving a locking signal to be set through the input element 104, and storing and setting the received locking signal together with the detected terminal direction value in the memory 102. Further, when in a locking signal unset mode, the controller 100 performs processing and controlling for detecting the terminal direction value by driving the direction sensor 110 while receiving the locking signal through the input element 104. The controller 100 also compares the received locking signal and the detected terminal direction value with the locking signal and terminal direction value pre-stored in the memory 102. Then, according to the comparison result, the controller 100 determines whether to unset the locking signal.

The memory 102 stores a microcode of a program, by which the controller 100 is processed and controlled, and a variety of reference data. Further, the memory 102 stores temporary data that is generated while various types of programs are performed, and also stores various types of updatable data to be stored. In particular, according to the present invention, the memory 102 stores the locking signal received from the input element 104 and the terminal direction value detected by the direction sensor 110 in a one-to-one manner. In this case, the terminal direction value may be stored in a one-to-one manner for each character of the locking signal, and the terminal direction value may be stored in a one-to-one manner for the locking signal itself.

The input element 104 may consist of a keypad, a touchpad, and a voice input element, and provides a signal input through these elements, such as, a locking signal of the present invention, to the controller 100. That is, when the input element 104 consists of the keypad or the touchpad, the input element 104 receives the locking signal according to a key input of a user, and when the input element 104 consists of the voice input element, the input element 104 receives the locking signal according to a voice input of the user. When the input element 104 consists of the voice input element, the input element 104 further includes a voice processor that converts a voice signal provided from the voice input element to digital data and that provides the converted digital data to the controller 100.

The counter 106 counts a specific time to determine whether there is a locking signal input to the input element 104 during a specific time after an input of the locking signal is requested to the user. If the locking signal is not input, even if the specific time elapses, the counter 106 reports counter expiration to the controller 100. Upon receiving the report on the counter expiration, the controller 100 may terminate the input of the locking signal, or may request the user to re-input the locking signal through the output element 108.

The output element 108 may consist of a display element and a voice output element, and performs a function for outputting entire information processed in the portable terminal. In particular, the output element 108 outputs information on a locking signal input request and an input state thereof, a comparison result, and an error (such as a locking signal inconsistency). When the output element 108 consists of the display element, the output element 108 outputs the information by means of the display, and when the output element 108 consists of the voice output element, the output element 108 outputs the information by means of a voice. When the output element 108 consists of the voice output element, the output element 108 further includes a voice processor that converts digital data provided from the controller 100 into an analog voice signal and that provides the converted analog voice signal to the voice output element.

The direction sensor 110 senses a direction in which the portable terminal is located to determine the terminal direction value, and provides the detected terminal direction value to the controller 100.

The terminal direction value can be detected by using various methods. In a first method, a direction indicator that recognizes a terminal direction may be provided in a specific portion of the portable terminal to detect a direction of the portable terminal. For example, when the portable terminal is placed facing down, the indicator included in the portable terminal indicates a downward direction of the portable terminal, so that it can be sensed that the portable terminal is placed facing down.

In a second method, a wide-angle signal transmission module (not shown) that includes directivity (such as a radio frequency (RF) with directivity) is provided in a specific portion of the portable terminal to sense a direction of the transmitted wide-angle signal. Therefore, the direction of the portable terminal can be sensed.

Figure 2:
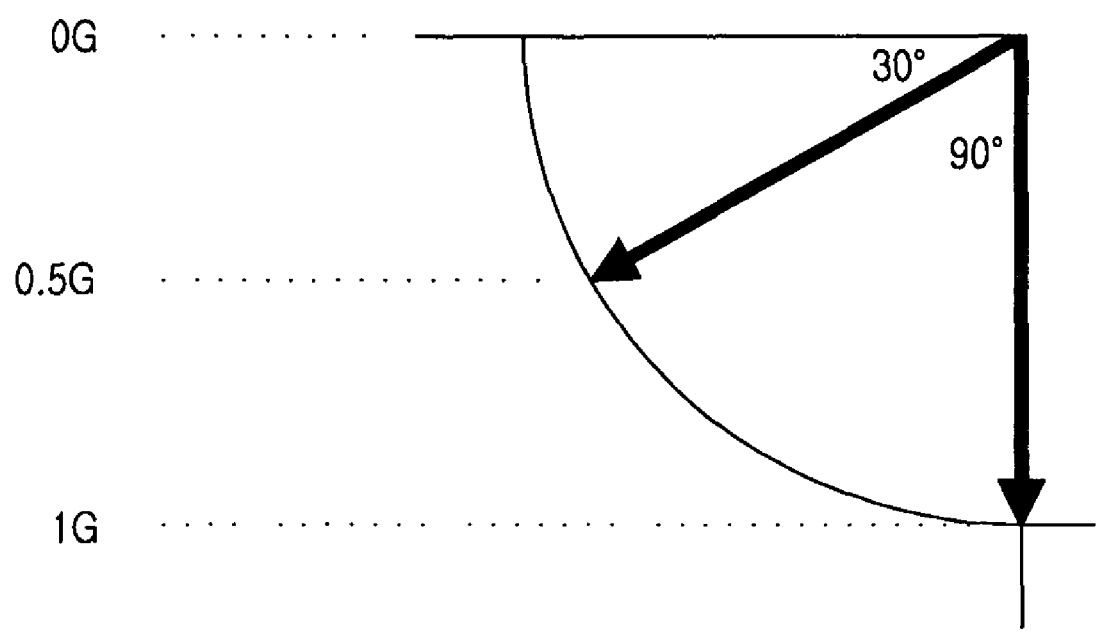
FIG. 2 illustrates a principle of operating an acceleration sensor depending on a direction sensor of FIG. 1 according to an exemplary embodiment of the present invention.

In a third method, an acceleration sensor is used to sense the direction of the portable terminal. A principle of operating the acceleration sensor will be described with reference to FIG. 2. The acceleration sensor outputs a magnitude of acceleration applied to an object, and is divided into several types according to the number of axes, such as, one axis, two axes, three axes, and so forth. For example, when using a 3-axis acceleration sensor, the magnitude of acceleration can be measured in a 3-dimensional space with 3 axes of x, y, and z. That is, according to a gravitational acceleration, the direction of the terminal can be sensed by considering a tilt angle of the object and an acceleration of an angular direction. The gravitational acceleration is defined as acceleration generated by gravity acting on a moving object (i.e., gravity movement). When the acceleration sensor located in a horizontal direction is tilted to 90 degrees and, thus, is located in a vertical direction under the influence of the gravity of the Earth, the detected gravitational acceleration has a magnitude of 1 G(9.8 m/s^2). Therefore, as shown in FIG. 2, the gravitational acceleration is related to sin(tilt angle). For example, if a magnitude of the acceleration sensor is 0.5 G as a result of measurement, a tilt angle of the object may be 30 degrees. That is, if a tilt is 45 degrees in the x-axis, the detected acceleration has a magnitude of 1 G×sin 45, that is, 0.707 G. If the acceleration detected by the acceleration sensor has a magnitude of 0 G in the x-axis and 1 G in the y-axis, it can be detected that the terminal is vertically placed along the y-axis direction, and otherwise, it can be detected that the terminal is horizontally placed along the x-axis direction. In addition, a gravity direction and a tilt state of the terminal can be sensed.

Figure 3:
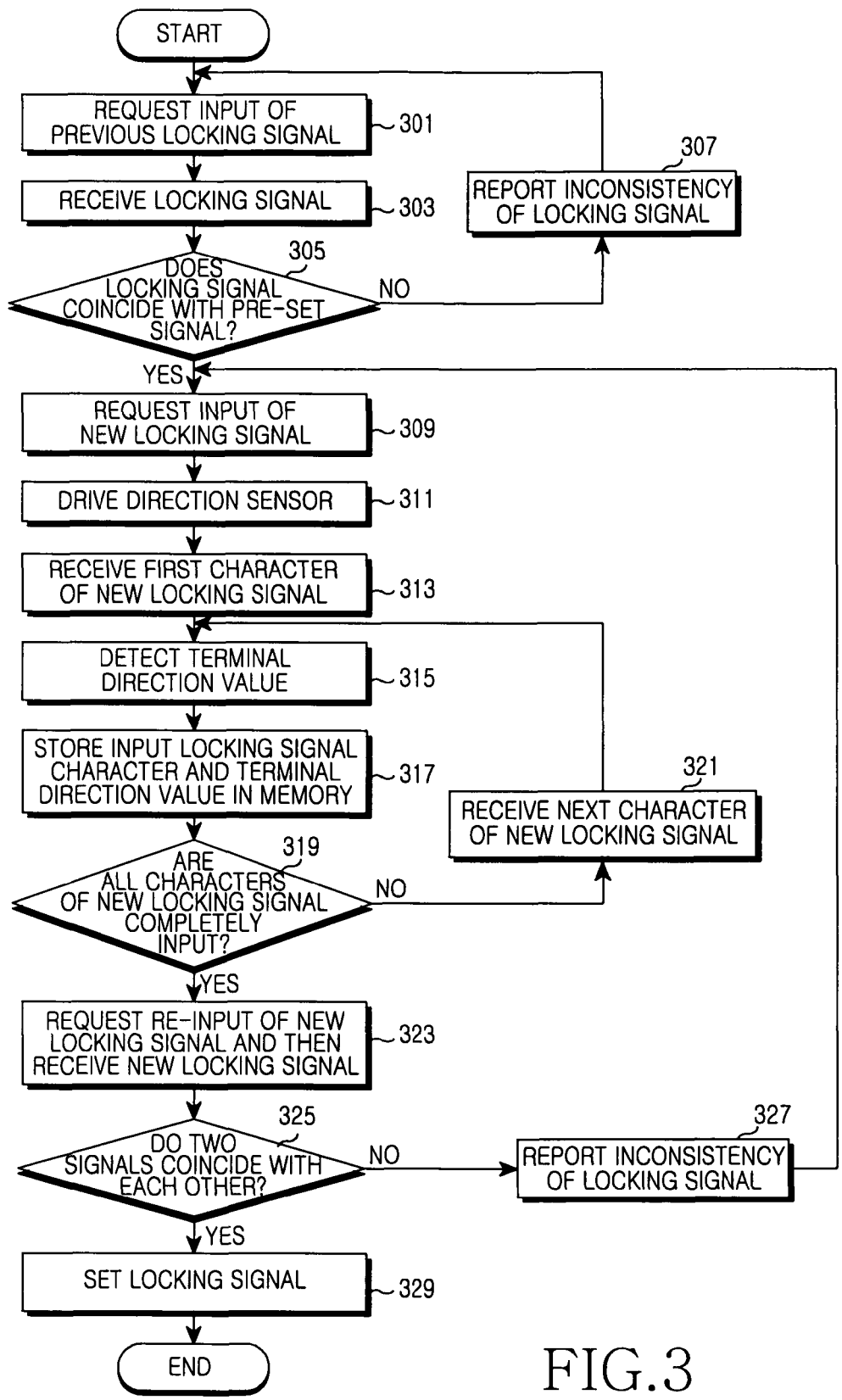
FIG. 3 illustrates a flowchart for a method of setting a locking signal of a portable terminal according to an exemplary embodiment of the present invention.

FIG. 3 illustrates a flowchart a method of setting a locking signal of a portable terminal according to an exemplary embodiment of the present invention.

Referring to FIG. 3, in step 301, if a pre-set locking signal exists, the terminal requests a user to input a previous locking signal by using the output element 108. In step 303, the terminal receives the previous locking signal by using the input element 104. In this case, if the previous locking signal is not input even after a specific time elapses, the terminal reports a locking signal confirmation error through the output element 108. Thereafter, returning to step 301, the subsequent steps may be repeated.

In step 305, the terminal compares the received previous locking signal with the pre-set locking signal to determine consistency of the two signals. If the received previous locking signal does not coincide with the pre-set locking signal, proceeding to step 307, the terminal reports an inconsistency of the previous locking signal to the user through the output element 108. Thereafter, returning to step 301, the subsequent steps are repeated. Otherwise, if the received previous locking signal coincides with the pre-set locking signal, proceeding to step 309, in order to set a new locking signal, the terminal requests the user to input the new locking signal through the output element 108. In step 311, the terminal drives the direction sensor 110.

In step 313, the terminal receives a first character of the new locking signal through the input element 104. In step 315, the terminal detects a direction value of the terminal by using the driven direction sensor 110. In this case, the terminal may inform the user that the terminal direction is stored together with each input unit of the locking signal through the output element 108. If no character is input even after a specific time elapses, the terminal reports a locking signal setting error through the output element 108. Then, returning to step 313, the subsequent steps may be repeated. In step 317, the terminal stores the input locking signal character and the detected terminal direction value in the memory 102.

In step 319, the terminal determines whether all characters of the new locking signal are completely input. If there is a character that is not input among the characters of the new locking signal, proceeding to step 321, the terminal receives a next character of the new locking signal through the input element 104. Then, returning to step 315, the subsequent steps are repeated. If no character is input until a specific time elapses, the terminal reports a locking signal setting error through the output element 108. Then, returning to step 321, the subsequent steps may be repeated.

Otherwise, if all characters of the new locking signal are completely input, proceeding to step 323, the terminal requests the user to re-input the new locking signal through the output element 108, and then receives the re-input new locking signal through the input element 104. In step 325, the terminal compares the input new locking signal with the re-input new locking signal to determine consistency of the two signals. If the input new locking signal does not coincide with the re-input locking signal, proceeding to step 327, the terminal reports the user of inconsistency of the new locking signal through the output element 108. Thereafter, returning to step 309, the subsequent steps are repeated. Otherwise, if the input new locking signal coincides with the re-input new locking signal, proceeding to step 329, the terminal sets the input new locking signal as the locking signal of the terminal.

Thereafter, the procedure of FIG. 3 ends.

Figure 4:
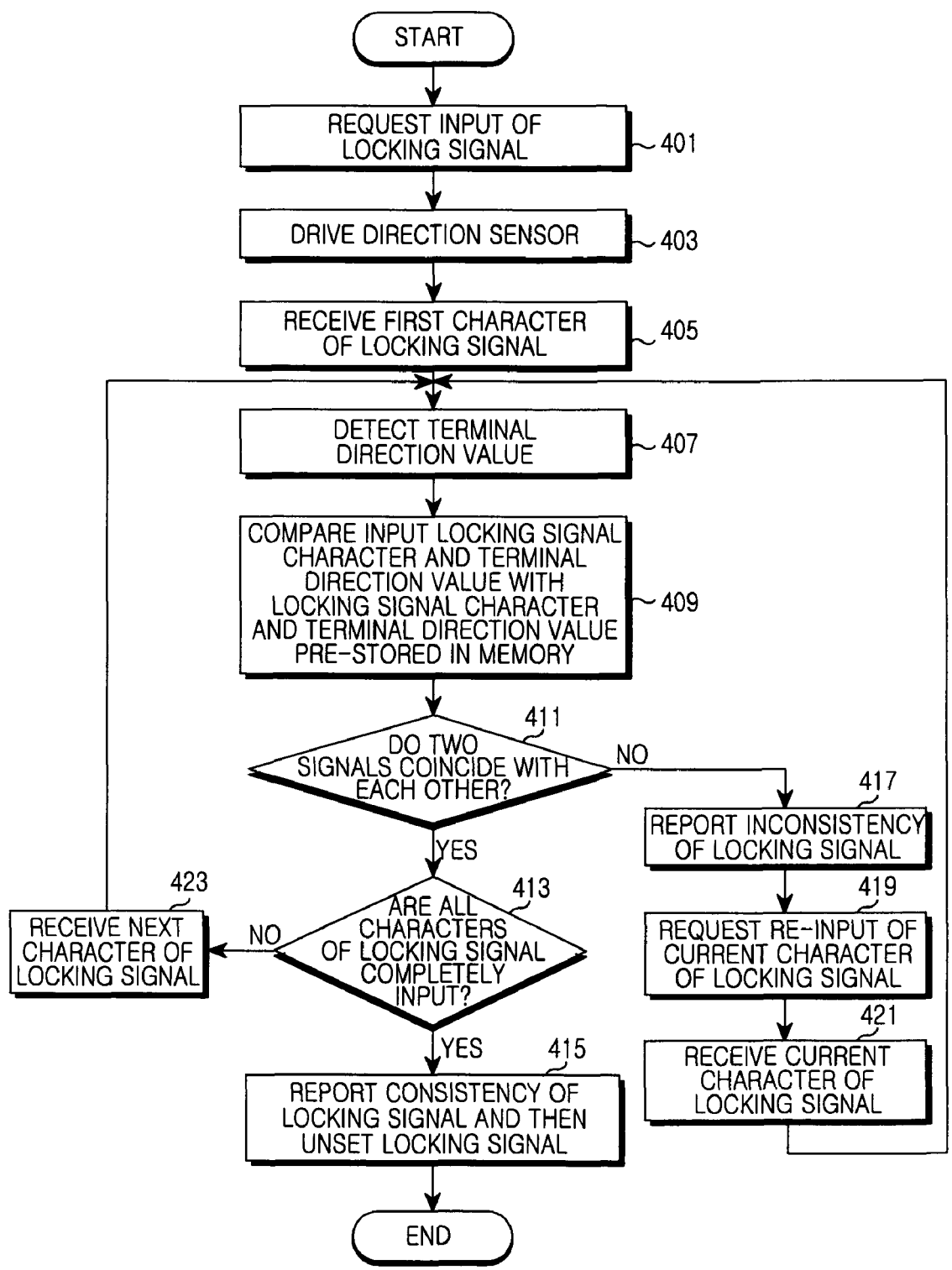
FIG. 4 illustrates a flowchart for a method of unsetting a locking signal of a portable terminal according to an exemplary embodiment of the present invention.

FIG. 4 illustrates a flowchart for a method of unsetting a locking signal of a portable terminal according to an exemplary embodiment of the present invention.

Referring to FIG. 4, in step 401, a terminal requests a user to input the locking signal through the output element 108 to unset the locking signal. In step 403, the terminal drives the direction sensor 110.

In step 405, the terminal receives a first character of the locking signal through the input element 104. In step 407, the terminal detects a terminal direction value by using the driven direction sensor 110. In this case, the terminal may inform the user in advance through the output element 108 that a direction of the terminal is authenticated together with each input unit of the locking signal. If no character is input even after a specific time elapses, the terminal reports a locking signal unsetting error through the output element 108. Then, returning to step 405, the subsequent steps may be repeated.

In step 409, the terminal extracts a locking signal character and terminal direction value pre-stored in the memory 102, and compares the input locking signal character and the detected terminal direction value with the extracted locking signal character and terminal direction value. In step 411, the terminal determines whether the input locking signal character and the detected terminal direction value coincide with the extracted locking signal character and terminal direction value.

If it is determined in step 411 that the input locking signal character and the detected terminal direction value do not coincide with the extracted locking signal character and terminal direction value, in step 417, the terminal reports the user inconsistency of the locking signal through the output input 108. In step 419, the terminal requests the user to re-input a current character of the locking signal. In step 421, the terminal receives the current character of the locking signal through the input element 104. Then, returning to step 407, the subsequent steps are repeated. If there is no input character, even after a specific time elapses, the terminal reports a locking signal unsetting error through the output element 108. Thereafter, returning to step 421, the subsequent steps may be repeated.

Otherwise, if it is determined in step 411 that the input locking signal character and the detected terminal direction value coincide with the extracted locking signal character and terminal direction value, in step 413, the terminal determines whether all characters of the locking signal are completely input. If there is a character which is not input among the characters of the locking signal, in step 423, the terminal receives a next character of the locking signal through the input element 104. Then, returning to step 407, the subsequent steps are repeated. If no character is input until a specific time elapses, the terminal reports a locking signal unsetting error through the output element 108. Then, returning to step 423, the subsequent steps may be repeated. Otherwise, if all characters of the locking signal are completely input, proceeding to step 415, the terminal reports consistency of the locking signal through the output element 108, and then unsets the locking signal of the terminal.

Thereafter, the procedure of FIG. 4 ends.

Figure 5:
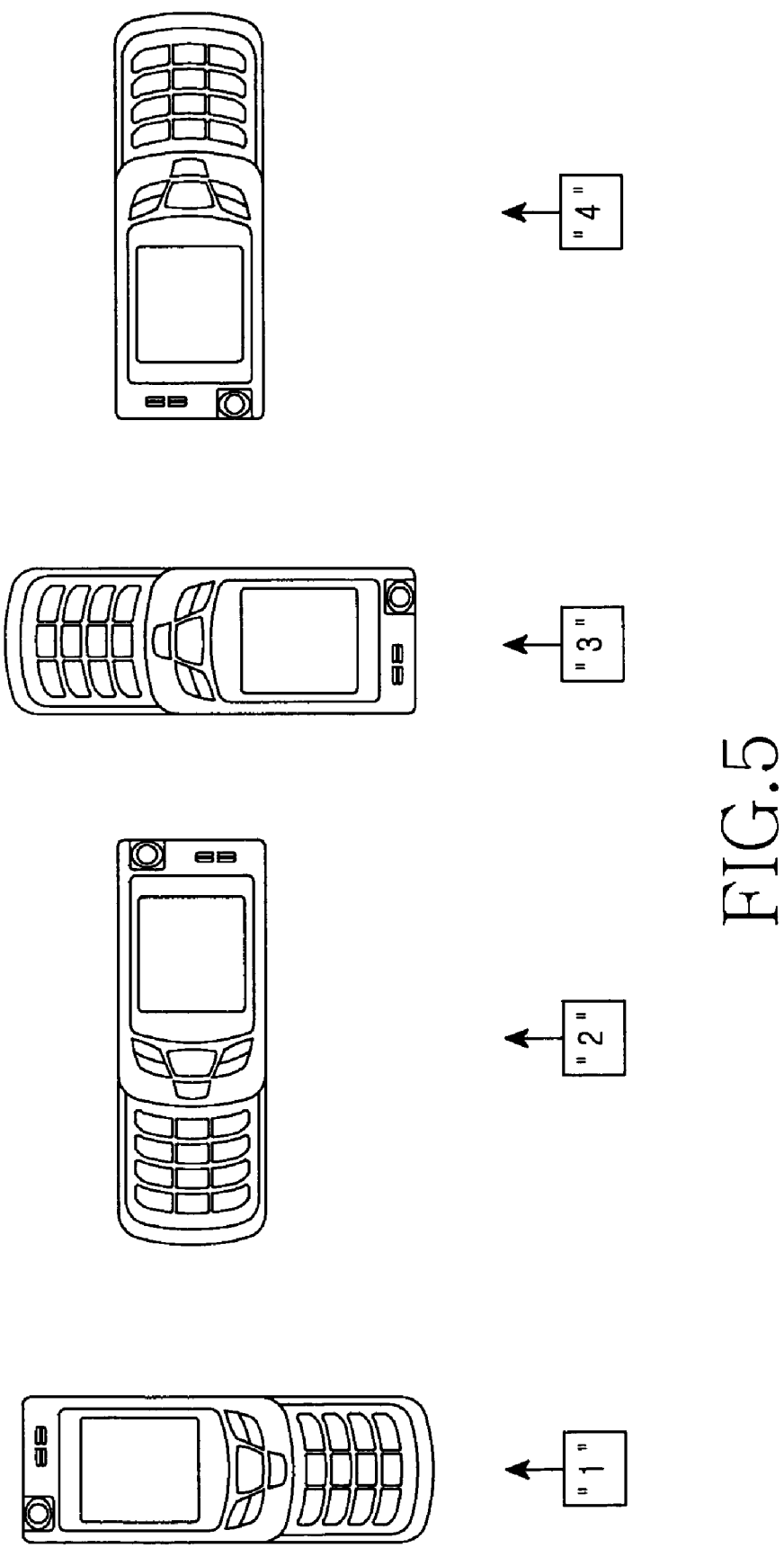
FIG. 5 illustrates a method of inputting a locking signal of a portable terminal according to an exemplary embodiment of the present invention.

FIG. 5 illustrates a method of inputting a locking signal of a portable terminal according to an exemplary embodiment of the present invention.

Referring to FIG. 5, when a locking signal is set to '1234' in the portable terminal, according to conventional technique, a user inputs the locking signal set to '1234' to the terminal by simply utilizing a keypad, and the terminal compares the input with a pre-stored locking signal, and unsets the locking signal on the basis of consistency of the compared signals.

Alternatively, according to the present invention, the user inputs the locking signal to the terminal by utilizing a direction sensor together with a keypad. That is, as shown in FIG. 5, when the user inputs a first character '1' of the locking signal, the terminal may be placed facing up. When the user inputs a next character '2', the terminal may be placed facing right. When the user inputs a next character '3', the terminal may be placed facing down. When the user inputs a last character '4', the terminal may be placed facing left. In this case, the terminal senses a direction of the terminal in each input unit of the input locking signal to detect a terminal direction value, and compares the input locking signal and the detected terminal direction value for each input unit with a pre-stored locking signal and terminal direction value. Only when the terminal direction values coincide with each other together with the locking signal is the locking signal unset.

Meanwhile, when the user input the locking signal to the terminal according to the present invention, an index in association with each character order of the locking signal may be added and stored so that it can be used when the locking signal is changed afterwards.

In a case where the user intends to use a locking signal which is set in a terminal only for that terminal, when the user inputs the locking signal to the terminal according to the present invention, a direction sensor identifier may be simultaneously stored so that the locking signal set in the terminal is not authenticated by another terminal having a different direction sensor identifier.

If there is a restriction on a memory included in the terminal, a special character that indicates that it is the same character as a previously input character can be used to save the memory of the terminal. That is, if the user inputs a simple locking signal in which the same character is continued, the terminal can store the special character that indicates that it is the same character as a previously input character. For example, in a case where the user places the terminal facing down and presses a key '1' and thereafter inputs a locking signal in which a character corresponding to the pressed key '1' is repeated four times, the terminal stores '1' corresponding to the first character and a direction value indicating that a direction of the terminal is 'down' in the memory, and thereafter stores a special character indicating that $2^{nd}$ to $4^{th}$ characters are the same as the previously input character. In doing so, ineffective memory usage caused when the same character is stored several times can be avoided.

According to exemplary embodiments of the present invention, a locking signal is set or unset by using a terminal direction value detected using a direction sensor (such as an acceleration sensor) together with the locking signal (such as password) as a security factor in a portable terminal. Therefore, even if the locking signal is exposed, the locking signal is not authenticated if a terminal direction value is not correct, thereby maintaining security of the locking signal in a further improved manner without having to add another complex functions. If it is assumed that twelve physical keys exist on a keypad, a probability that the locking signal is correctly guessed by an attacker is 1/(12^[locking signal length]) in the conventional case, whereas the probability is 1/(12^[locking signal length]*6^[locking signal length]) in the present invention. Therefore, it can be seen that the present invention is more secure against a hacking attack than the conventional method. As such, the present invention can overcome a shortcoming of the conventional locking signal authentication in which a password can be easily guessed by simply combining several numeric characters. In addition, by considering a hardware issue (i.e., a terminal direction) when a locking signal is input, the locking signal cannot be authenticated when only a software attack takes place by the attacker.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of setting or unsetting a lock of a portable terminal, the method comprising:
   inputting a locking signal;
   detecting a direction information of the portable terminal using a direction sensor; and
   setting the lock of the portable terminal by storing the input locking signal and the detected direction information in a memory, or unsetting the lock of the portable terminal by comparing the input locking signal and the detected direction information with a pre-stored locking signal and a pre-stored direction information pre-stored in the memory,
   wherein the direction sensor senses a direction in which the portable terminal is moved.

2. The method of claim 1, wherein the locking signal is input through at least one of a keypad, a touchpad, and a voice input element.

3. The method of claim 1, wherein the direction information is detected by the direction sensor using a direction indicator which is pre-set in a specific portion of the portable terminal.

4. The method of claim 1, wherein the direction information is detected by the direction sensor by sensing a direction of a wide-angle signal which is transmitted through a wide-angle signal transmission module having a directivity and pre-installed in a specific portion of the portable terminal.

5. The method of claim 1, wherein the direction information is detected by an acceleration sensor of the direction sensor that measures a tilt angle of the portable terminal and an acceleration applied to the portable terminal.

6. The method of claim 1, further comprising generating and outputting a message for reporting at least one of an input result, a storing result, a lock setting state, and a lock unsetting state of the locking signal.

7. The method of claim 1, further comprising, if the comparison result shows that the input locking signal and the detected direction information do not coincide with the locking signal and direction information pre-stored in the memory, generating and outputting at least one of a message for indicating inconsistency of that the locking signal and a message for requesting a re-input of the locking signal.

8. The method of claim 1, further comprising, if the locking signal is not input during a pre-set time, generating and outputting a message for requesting a re-input of the locking signal.

9. An apparatus for setting or unsetting a lock of a portable terminal, the apparatus comprising:
   an input element configured to receive an input a locking signal;
   a direction sensor configured to detect a direction information of the portable terminal; and
   a controller configured to at least one of:
     set the lock of the portable terminal by storing the input locking signal and the detected direction information in a memory; and
     unset the lock of the portable terminal by comparing the input locking signal and the detected direction information with a pre-stored locking signal and a pre-stored direction information pre-stored in the memory,
   wherein the direction sensor senses a direction in which the portable terminal is moved.

10. The apparatus of claim 9, wherein the input element comprises at least one of a keypad, a touchpad, and a voice input element.

11. The apparatus of claim 9, wherein the direction sensor is configured to detect the direction information by using a direction indicator which is pre-set in a specific portion of the portable terminal.

12. The apparatus of claim 9, wherein the direction sensor is configured to detect the direction information by sensing a direction of a wide-angle signal which is transmitted through a wide-angle signal transmission module including a directivity and pre-installed in a specific portion of the portable terminal.

13. The apparatus of claim 9, wherein the direction sensor comprises an acceleration sensor, and detects the direction information by measuring a tilt angle of the portable terminal and an acceleration applied to the portable terminal.

14. The apparatus of claim 9, further comprising an output element configured to generate and output a message for reporting at least one of an input result, a storing result, a lock setting state, and a lock unsetting state of the locking signal.

15. The apparatus of claim 9, further comprising an output element configured to generate and output at least one of a message for indicating inconsistency of the locking signal and a message for requesting a re-input of the locking signal if the comparison result shows that the input locking signal and the detected direction information do not coincide with the locking signal and direction information pre-stored in the memory.

16. The apparatus of claim 9, further comprising an output element configured to generate and output a message for requesting a re-input of the locking signal if the locking signal is not input during a pre-set time.

17. A portable terminal for use in a wireless communication network, the portable terminal comprising:
   an apparatus for setting or unsetting a lock of a portable terminal, the apparatus comprising:
     an input element configured to receive an input a locking signal;
     a direction sensor configured to detect a direction information of the portable terminal; and
     a controller configured to at least one of:
       set the lock of the portable terminal by storing the input locking signal and the detected direction information in a memory; and
       unset the lock of the portable terminal by comparing the input locking signal and the detected direction information with a pre-stored locking signal and a pre-stored direction information pre-stored in the memory,
     wherein the direction sensor senses a direction in which the portable terminal is moved.

18. The portable terminal of claim 17, wherein the input element comprises at least one of a keypad, a touchpad, and a voice input element.

19. The portable terminal of claim 18, further comprising an output element configured to generate and output at least one of a message for indicating inconsistency of the locking signal and a message for requesting a re-input of the locking signal if the comparison result shows that the input locking signal and the detected direction information do not coincide with the locking signal and direction information pre-stored in the memory.

20. The portable terminal of claim 18, further comprising an output element configured to generate and output a message for requesting a re-input of the locking signal if the locking signal is not input during a pre-set time.

21. The portable terminal of claim 17, wherein the direction sensor is configured to detect the direction information by using a direction indicator which is pre-set in a specific portion of the portable terminal.

22. The portable terminal of claim 17, wherein the direction sensor is configured to detect the direction information by sensing a direction of a wide-angle signal which is transmitted through a wide-angle signal transmission module including a directivity and pre-installed in a specific portion of the portable terminal.

23. The portable terminal of claim 17, wherein the direction sensor comprises an acceleration sensor, and detects the direction information by measuring a tilt angle of the portable terminal and an acceleration applied to the portable terminal.

24. The portable terminal of claim 17, further comprising an output element configured to generate and output a message for reporting at least one of an input result, a storing result, a lock setting state, and a lock unsetting state of the locking signal.

* * * * *